(12) United States Patent
Kupfer et al.

(10) Patent No.: US 10,920,080 B2
(45) Date of Patent: Feb. 16, 2021

(54) N-ALKYL GLUCAMINE-BASED UNIVERSAL PIGMENT DISPERSIONS

(71) Applicant: Clariant International Ltd., Muttenz (CH)

(72) Inventors: Rainer Kupfer, Hattersheim (DE); Christoph Söffing, Mettmann (DE); Jörg Rüger, Goldbach (DE)

(73) Assignee: Clariant International Ltd., Muttenz (CH)

( * ) Notice: Subject to any disclaimer, the term of this patent is extended or adjusted under 35 U.S.C. 154(b) by 39 days.

(21) Appl. No.: 15/766,539

(22) PCT Filed: Sep. 15, 2016

(86) PCT No.: PCT/EP2016/071750
§ 371 (c)(1),
(2) Date: Apr. 6, 2018

(87) PCT Pub. No.: WO2017/060051
PCT Pub. Date: Apr. 13, 2017

(65) Prior Publication Data
US 2018/0291208 A1 Oct. 11, 2018

(30) Foreign Application Priority Data
Oct. 9, 2015 (DE) .................. 10 2015 219 608

(51) Int. Cl.
| C09B 67/46 | (2006.01) |
| C09D 17/00 | (2006.01) |
| C09D 5/02 | (2006.01) |
| C08K 5/17 | (2006.01) |

(52) U.S. Cl.
CPC ...... *C09B 67/0089* (2013.01); *C09B 67/0086* (2013.01); *C09D 5/024* (2013.01); *C09D 17/001* (2013.01); *C09D 17/007* (2013.01); *C08K 5/17* (2013.01); *C09D 5/027* (2013.01)

(58) Field of Classification Search
CPC . C09B 67/0086; C09B 67/0089; C09D 5/024; C09D 17/001; C09D 17/007; C09D 5/027; C08K 5/17
See application file for complete search history.

(56) References Cited

U.S. PATENT DOCUMENTS

| | | |
|---|---|---|
| 2,016,962 A | 10/1935 | Flint |
| 2,667,478 A | 1/1954 | Schwartz |
| 2,703,798 A | 3/1955 | Schwartz |
| 2,891,052 A | 6/1959 | Boettner |
| 2,982,737 A | 5/1961 | Boettner |
| 2,993,887 A | 7/1961 | Zech |
| 3,002,923 A | 10/1961 | Barker |
| 3,272,795 A | 9/1966 | Basil |
| 4,079,078 A | 3/1978 | Collins |
| 4,341,559 A | 7/1982 | Friedemann |
| 4,400,196 A | 8/1983 | Albrecht |
| 4,413,087 A | 11/1983 | Bernot |
| 4,481,186 A | 11/1984 | Deckner |
| 4,505,827 A | 3/1985 | Rose |
| 4,565,647 A | 1/1986 | Llenado |
| 4,654,207 A | 3/1987 | Preston |
| 4,681,946 A | 7/1987 | Baur |
| 4,981,684 A | 1/1991 | MacKenzie |
| 5,009,814 A | 4/1991 | Kelkenberg |
| 5,194,639 A | 3/1993 | Connor |
| 5,254,281 A | 10/1993 | Pichardo |
| 5,298,195 A | 3/1994 | Brumbaugh |
| 5,317,047 A | 5/1994 | Sabate |
| 5,354,425 A | 10/1994 | MacKey |
| 5,449,770 A | 9/1995 | Shumate |
| 5,454,982 A | 10/1995 | Murch |
| 5,500,155 A | 3/1996 | Weuthen |

(Continued)

FOREIGN PATENT DOCUMENTS

| | | |
|---|---|---|
| CA | 2117007 | 9/1994 |
| CA | 1333226 | 11/1994 |

(Continued)

OTHER PUBLICATIONS

"Product Specification: N-octanoyl-N-methylglucamine", Jun. 29, 2000 (Jun. 29, 2000), pp. 1-1, XP055098500, Retrieved from the Internet: URL:http://www.sigmaaldrich.com/Graphics/COfAInfo/SigmaSAPQM/SPEC/03/03129/03129-BULKSIGMA.pdf.
Bezard (Lipids 1971;6:630-634).
Dale et al. (J. Sci. Food. Agric. 1955;6:166-170) (Year: 1955).
English Translation of Cited Excerpts of CN103468382A, Dec. 25, 2013. 2 pages.
European Coatings Journal in 2009, vol. 07, pp. 26-28.
Friedrich Vogel: "Kosmetik aus der Sicht des Chemikers", Chemie in Unserer Zeit, No. 5, Jan. 1, 1986, pp. 156-164, XP055109030, DOI: 10.1002/ciuz.19860200504, p. 160.

(Continued)

*Primary Examiner* — Anthony J Green
(74) *Attorney, Agent, or Firm* — Tod A. Waldrop

(57) ABSTRACT

The invention relates to aqueous binder-free pigment dispersions containing (A) at least one organic and/or inorganic pigment, (B) one or more dispersing agents and/or surfactants, (C) at least one base of formula (I), where $R^1$ is H, $C_1$-$C_4$-alkyl, $CH_2CH_2OH$ or $CH_2CH(CH_3)OH$, (D) optionally, one or more polyalkylene glycols, (E) optionally, other additives commonly used for making aqueous pigment dispersions, and (F) water.

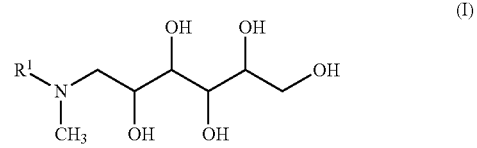

(I)

27 Claims, No Drawings

(56) References Cited

U.S. PATENT DOCUMENTS

| | | |
|---|---|---|
| 5,539,134 A | 7/1996 | Strecker |
| 5,559,078 A | 9/1996 | Garst |
| 5,560,873 A | 10/1996 | Chen |
| 5,625,098 A | 4/1997 | Kao |
| 5,691,299 A | 11/1997 | Fabry |
| 5,711,899 A | 1/1998 | Kawa |
| 5,712,235 A | 1/1998 | Nieendick |
| 5,716,922 A | 2/1998 | Curry |
| 5,750,748 A | 5/1998 | Boutique |
| 5,766,267 A | 6/1998 | Schumacher |
| 5,777,165 A | 7/1998 | Kao |
| 5,789,372 A | 8/1998 | Fabry |
| 5,874,096 A | 2/1999 | Hazen |
| 5,945,389 A | 8/1999 | Richard |
| 6,147,045 A | 11/2000 | Lappas |
| 6,147,124 A | 11/2000 | Ansmann |
| 6,165,955 A | 12/2000 | Chen |
| 6,264,961 B1 | 7/2001 | Ansmann |
| 6,274,126 B1 | 8/2001 | Newell |
| 6,288,023 B1 | 9/2001 | Honda |
| 6,329,331 B1 | 12/2001 | Aronson |
| 6,350,788 B1 | 2/2002 | Herold |
| 6,391,962 B2 | 5/2002 | Zerrer |
| 6,455,001 B1 | 9/2002 | Knappe |
| 6,635,708 B1 | 10/2003 | Papenfuhs |
| 6,727,217 B1 | 4/2004 | Nieendick |
| 6,887,838 B2 | 5/2005 | Dykstra et al. |
| 6,903,057 B1 | 6/2005 | Tsaur |
| 7,056,379 B2 | 6/2006 | Nieendick |
| 7,217,752 B2 | 5/2007 | Schmucker-Castner et al. |
| 7,250,392 B1 | 7/2007 | Leonard |
| 7,297,666 B2 | 11/2007 | Kuepper |
| 7,380,606 B2 | 6/2008 | Pursley |
| 7,407,667 B2 | 8/2008 | Zerrer |
| 7,578,995 B2 | 8/2009 | Frantz |
| 7,776,318 B2 | 8/2010 | Bissey-Beugras |
| 7,820,771 B2 | 10/2010 | Lapra |
| 7,872,036 B2 | 1/2011 | Toriyabe |
| 7,897,543 B2 | 3/2011 | Bretschneider et al. |
| 7,998,911 B1 | 8/2011 | Berger |
| 8,084,452 B2 | 12/2011 | Jeschke |
| 8,178,481 B2 | 5/2012 | Sans |
| 8,220,564 B2 | 7/2012 | Runquist |
| 8,263,538 B2 | 9/2012 | Tsaur |
| 8,324,390 B2 | 12/2012 | Fischer |
| 8,404,855 B2 | 3/2013 | Jeschke |
| 8,536,340 B2 | 9/2013 | Hamamoto |
| 8,637,432 B2 | 1/2014 | Baur |
| 8,729,323 B2 | 5/2014 | Kothandaraman et al. |
| 8,759,255 B2 | 6/2014 | Wacker |
| 8,809,547 B2 | 8/2014 | Bretschneider et al. |
| 8,901,041 B2 | 12/2014 | Frisch |
| 9,187,407 B2 | 11/2015 | Koshti |
| 9,504,636 B2 | 11/2016 | Klug |
| 9,949,909 B2 | 4/2018 | Klug |
| 1,017,277 A1 | 1/2019 | Klug |
| 1,026,525 A1 | 4/2019 | Klug |
| 2001/0023298 A1 | 9/2001 | Weinelt |
| 2001/0056048 A1 | 12/2001 | Bertolosso |
| 2002/0004476 A1 | 1/2002 | Pancheri et al. |
| 2002/0040662 A1 | 4/2002 | Dietz |
| 2002/0065198 A1 | 5/2002 | Highsmith |
| 2002/0168417 A1 | 11/2002 | Blease et al. |
| 2003/0004929 A1 | 1/2003 | Julian |
| 2003/0049292 A1 | 3/2003 | Turowski-Wanke et al. |
| 2003/0069153 A1 | 4/2003 | Jordan |
| 2003/0199403 A1 | 10/2003 | Wells |
| 2004/0086470 A1 | 5/2004 | Nieendick |
| 2005/0037926 A1 | 2/2005 | Zerrer |
| 2005/0037942 A1 | 2/2005 | Otterson et al. |
| 2005/0172859 A1 | 8/2005 | Nieendick |
| 2005/0233935 A1 | 10/2005 | Gunn |
| 2006/0058205 A1 | 3/2006 | Ainger |
| 2006/0079414 A1 | 4/2006 | Nieendick |
| 2006/0089294 A1 | 4/2006 | Depoot |
| 2006/0100127 A1* | 5/2006 | Meier ............ A61K 8/41 510/499 |
| 2006/0110415 A1 | 5/2006 | Gupta |
| 2006/0110432 A1 | 5/2006 | Luu |
| 2006/0135382 A1 | 6/2006 | Molenda |
| 2006/0142291 A1 | 6/2006 | Beilfuss |
| 2006/0166826 A1 | 7/2006 | Zerrer |
| 2006/0171979 A1 | 8/2006 | Calvo |
| 2007/0054820 A1 | 3/2007 | Harichian |
| 2007/0060489 A1 | 3/2007 | Sun |
| 2007/0110700 A1 | 5/2007 | Wells |
| 2007/0128144 A1 | 6/2007 | Bonastre Gilabert et al. |
| 2007/0190004 A1 | 8/2007 | Bockmuhl |
| 2007/0213226 A1 | 9/2007 | Sieverding |
| 2008/0057014 A1 | 3/2008 | Masuda |
| 2008/0317960 A1* | 12/2008 | Pitt ............ B01F 17/0028 427/384 |
| 2009/0023622 A1 | 1/2009 | Leidreiter |
| 2009/0042749 A1 | 2/2009 | Meier |
| 2009/0111847 A1 | 4/2009 | Li |
| 2009/0118152 A1 | 5/2009 | Lam |
| 2009/0124498 A1 | 5/2009 | Von Deyn |
| 2009/0253612 A1 | 10/2009 | Mushock |
| 2009/0257972 A1 | 10/2009 | Dieker |
| 2010/0051200 A1 | 3/2010 | Mueller |
| 2010/0285077 A1 | 11/2010 | Lintner |
| 2010/0326320 A1 | 12/2010 | Swedo |
| 2011/0002865 A1 | 1/2011 | Fournial |
| 2011/0146536 A1 | 6/2011 | Tomlinson |
| 2011/0150786 A1 | 6/2011 | Desenne |
| 2011/0152150 A1 | 6/2011 | Bernard |
| 2011/0177945 A1 | 7/2011 | Klingelhoefer |
| 2011/0251116 A1 | 10/2011 | Aehle |
| 2011/0263471 A1 | 10/2011 | Barnhart |
| 2012/0009127 A1 | 1/2012 | Dasgupta et al. |
| 2012/0010113 A1 | 1/2012 | Hee |
| 2012/0070388 A1 | 3/2012 | Man |
| 2012/0073817 A1 | 3/2012 | Van Zanten |
| 2012/0094890 A1 | 4/2012 | Anantaneni |
| 2012/0172223 A1 | 7/2012 | Wacker |
| 2012/0244092 A1 | 9/2012 | Moser |
| 2013/0030197 A1 | 1/2013 | Harichian |
| 2013/0189212 A1 | 7/2013 | Jawale et al. |
| 2013/0216491 A1 | 8/2013 | Ogihara |
| 2014/0096969 A1 | 4/2014 | Ali |
| 2014/0135245 A1 | 5/2014 | Annaheim |
| 2014/0230841 A1* | 8/2014 | Mathonneau ......... A61K 8/342 132/202 |
| 2014/0255330 A1 | 9/2014 | Cron |
| 2014/0303389 A1 | 10/2014 | Crosby et al. |
| 2015/0032003 A1 | 1/2015 | Cho |
| 2015/0125415 A1 | 5/2015 | Klug |
| 2015/0126424 A1 | 5/2015 | Klug |
| 2015/0126616 A1 | 5/2015 | Klug |
| 2015/0133560 A1 | 5/2015 | Klug |
| 2015/0140048 A1 | 5/2015 | Klug |
| 2015/0141466 A1 | 5/2015 | Klug |
| 2015/0141508 A1 | 5/2015 | Klug |
| 2015/0150767 A1 | 6/2015 | Klug |
| 2015/0164755 A1 | 6/2015 | Klug |
| 2015/0164756 A1 | 6/2015 | Klug |
| 2015/0282478 A1 | 10/2015 | Baur |
| 2015/0320037 A1 | 11/2015 | Wacker |
| 2015/0335550 A1 | 11/2015 | Koshti |
| 2016/0074310 A1 | 3/2016 | Klug |
| 2016/0136072 A1 | 5/2016 | Klug |
| 2016/0143828 A1 | 5/2016 | Klug |
| 2016/0243014 A1 | 8/2016 | Dahms |
| 2016/0272666 A1 | 9/2016 | Klug |
| 2016/0361243 A1 | 12/2016 | Klug |
| 2017/0000710 A1 | 1/2017 | Klug |
| 2017/0002297 A1 | 1/2017 | Klug |
| 2017/0044434 A1 | 2/2017 | Baur |
| 2017/0055524 A1 | 3/2017 | Baur |
| 2017/0071199 A1 | 3/2017 | Baur |
| 2017/0101606 A1 | 4/2017 | Klug |
| 2017/0218293 A1 | 8/2017 | Klug |
| 2017/0226349 A1* | 8/2017 | Kupfer ............ B01F 17/0028 |
| 2017/0265477 A1 | 9/2017 | Baur |

(56) References Cited

U.S. PATENT DOCUMENTS

| | | | |
|---|---|---|---|
| 2017/0292062 | A1 | 10/2017 | Wylde |
| 2017/0305838 | A1 | 10/2017 | Appel |
| 2018/0215879 | A1 | 8/2018 | Kupfer |
| 2018/0291208 | A1 | 10/2018 | Kupfer |
| 2019/0076344 | A1 | 3/2019 | Klug |

FOREIGN PATENT DOCUMENTS

| | | |
|---|---|---|
| CA | 2127644 | 1/1995 |
| CN | 1061960 | 6/1992 |
| CN | 1077489 | 10/1993 |
| CN | 1078746 | 11/1993 |
| CN | 1088258 | 6/1994 |
| CN | 1140987 | 1/1997 |
| CN | 1141653 | 1/1997 |
| CN | 1155239 | 7/1997 |
| CN | 1184417 A | 6/1998 |
| CN | 1292641 | 4/2001 |
| CN | 1296524 | 5/2001 |
| CN | 1501772 | 6/2004 |
| CN | 1518408 | 8/2004 |
| CN | 1594518 | 3/2005 |
| CN | 100528887 C | 5/2006 |
| CN | 1997341 | 7/2007 |
| CN | 101056959 A | 10/2007 |
| CN | 102186340 | 9/2011 |
| CN | 102595882 | 7/2012 |
| CN | 103468362 | 12/2013 |
| CN | 103468382 | 12/2013 |
| CN | 104918490 | 9/2015 |
| DE | 1956509 | 5/1971 |
| DE | 2226872 A1 | 12/1973 |
| DE | 4238211 | 1/1994 |
| DE | 4235783 | 4/1994 |
| DE | 4435383 | 11/1995 |
| DE | 19507531 | 9/1996 |
| DE | 19701127 | 7/1998 |
| DE | 19808824 | 10/1999 |
| DE | 19846429 | 4/2000 |
| DE | 19916090 | 10/2000 |
| DE | 10117993 | 10/2002 |
| DE | 10130357 | 1/2003 |
| DE | 102007034438 | 1/2009 |
| DE | 202013011412 | 1/2014 |
| DE | 202013011413 | 1/2014 |
| DE | 102012021647 | 5/2014 |
| EP | 0039860 | 11/1981 |
| EP | 0048436 | 3/1982 |
| EP | 0285768 | 10/1988 |
| EP | 0285786 | 10/1988 |
| EP | 0336151 | 10/1989 |
| EP | 0378985 | 7/1990 |
| EP | 0407874 | 1/1991 |
| EP | 0412849 A2 | 2/1991 |
| EP | 0539588 | 5/1993 |
| EP | 0550637 | 7/1993 |
| EP | 0572723 | 12/1993 |
| EP | 0614881 | 9/1994 |
| EP | 0633244 | 1/1995 |
| EP | 0709449 | 5/1996 |
| EP | 0745719 | 12/1996 |
| EP | 0769548 A1 | 4/1997 |
| EP | 0774503 A1 | 5/1997 |
| EP | 0995994 | 4/2000 |
| EP | 1043017 | 10/2000 |
| EP | 1078978 | 2/2001 |
| EP | 1093722 | 4/2001 |
| EP | 1110944 | 6/2001 |
| EP | 1177223 | 2/2002 |
| EP | 1379129 | 1/2004 |
| EP | 1422288 | 5/2004 |
| EP | 1529832 | 5/2005 |
| EP | 1676831 | 7/2006 |
| EP | 1716842 | 11/2006 |
| JP | S4810053 B | 2/1973 |
| JP | S63270534 | 11/1988 |
| JP | H06501731 | 2/1994 |
| JP | H06501733 | 2/1994 |
| JP | H06240599 | 8/1994 |
| JP | H07507341 | 8/1995 |
| JP | H0812993 | 1/1996 |
| JP | H0848618 | 2/1996 |
| JP | H09502476 | 3/1997 |
| JP | H09506683 | 6/1997 |
| JP | H09510956 | 11/1997 |
| JP | H10501279 | 2/1998 |
| JP | H10508043 | 8/1998 |
| JP | H11505839 | 5/1999 |
| JP | H11246890 | 9/1999 |
| JP | H11512334 | 10/1999 |
| JP | 2000512286 | 9/2000 |
| JP | 2000297028 | 10/2000 |
| JP | 2001501635 | 2/2001 |
| JP | 2001131579 | 5/2001 |
| JP | 2001247528 | 9/2001 |
| JP | 2002542344 A | 12/2002 |
| JP | 2006183030 | 7/2006 |
| JP | 2006183039 | 7/2006 |
| JP | 2007538023 | 12/2007 |
| JP | 2008110953 | 5/2008 |
| JP | 2010018586 | 1/2010 |
| JP | 2010037252 | 2/2010 |
| JP | 2013534232 | 9/2013 |
| JP | 2014532815 | 12/2014 |
| JP | 2015518026 | 6/2015 |
| JP | 2017526776 | 9/2017 |
| WO | 9205764 A1 | 4/1992 |
| WO | 9206073 | 4/1992 |
| WO | 9206154 | 4/1992 |
| WO | 9206158 A1 | 4/1992 |
| WO | 9206161 A1 | 4/1992 |
| WO | 9206162 A1 | 4/1992 |
| WO | 9318125 | 9/1993 |
| WO | 9319149 | 9/1993 |
| WO | 9410130 | 5/1994 |
| WO | 9412608 | 6/1994 |
| WO | 9412609 | 6/1994 |
| WO | 9419941 | 9/1994 |
| WO | 9516824 | 6/1995 |
| WO | 9517880 A1 | 7/1995 |
| WO | 9519415 | 7/1995 |
| WO | 9523840 | 9/1995 |
| WO | 9533033 | 12/1995 |
| WO | 9533035 | 12/1995 |
| WO | 9603974 A1 | 2/1996 |
| WO | 9610386 | 4/1996 |
| WO | 9614374 | 5/1996 |
| WO | 9616540 | 6/1996 |
| WO | 9628023 | 9/1996 |
| WO | 9637589 | 11/1996 |
| WO | 9637592 | 11/1996 |
| WO | 9747284 A1 | 12/1997 |
| WO | 9800496 A1 | 1/1998 |
| WO | 9841601 | 9/1998 |
| WO | 9856496 | 12/1998 |
| WO | 9951716 | 10/1999 |
| WO | 0065014 | 11/2000 |
| WO | 0137658 | 5/2001 |
| WO | 0160877 | 8/2001 |
| WO | 02089575 | 11/2002 |
| WO | 2002096882 | 12/2002 |
| WO | 03000055 | 1/2003 |
| WO | 2003106457 | 12/2003 |
| WO | 2004056358 | 7/2004 |
| WO | 2004099150 | 11/2004 |
| WO | 2004099160 | 11/2004 |
| WO | 2005035486 | 4/2005 |
| WO | 2005063094 | 7/2005 |
| WO | 2005077934 | 8/2005 |
| WO | 2005117580 | 12/2005 |
| WO | 2006043635 | 4/2006 |
| WO | 2006056433 | 6/2006 |
| WO | 2006089633 | 8/2006 |
| WO | 2006100288 | 9/2006 |

(56) References Cited

FOREIGN PATENT DOCUMENTS

| WO | 2007040280 | | 4/2007 | |
|---|---|---|---|---|
| WO | 2007057407 | | 5/2007 | |
| WO | 2007075459 | | 7/2007 | |
| WO | 2007101369 | | 9/2007 | |
| WO | 2007115643 | | 10/2007 | |
| WO | 2007115644 | | 10/2007 | |
| WO | 2007115646 | | 10/2007 | |
| WO | 2007141066 | A1 | 12/2007 | |
| WO | 2007147500 | | 12/2007 | |
| WO | 2007149134 | | 12/2007 | |
| WO | 2005085216 | | 1/2008 | |
| WO | 2008009360 | | 1/2008 | |
| WO | 2008066153 | | 6/2008 | |
| WO | 2008067911 | | 6/2008 | |
| WO | 2008104503 | | 9/2008 | |
| WO | 2009002956 | | 12/2008 | |
| WO | 2009029561 | | 3/2009 | |
| WO | 2009049851 | | 4/2009 | |
| WO | 2009158478 | | 12/2009 | |
| WO | 2010005692 | | 1/2010 | |
| WO | 2010006713 | | 1/2010 | |
| WO | 2010069502 | | 6/2010 | |
| WO | 2010074747 | | 7/2010 | |
| WO | 2010074751 | | 7/2010 | |
| WO | 2010126657 | | 11/2010 | |
| WO | 2010138661 | | 12/2010 | |
| WO | 2011138450 | A2 | 11/2011 | |
| WO | 2012061991 | | 5/2012 | |
| WO | 2012116939 | | 9/2012 | |
| WO | WO-2013016270 | A1 * | 1/2013 | ............ A01N 33/08 |
| WO | 2013178668 | | 12/2013 | |
| WO | 2013178670 | A2 | 12/2013 | |
| WO | 2013178671 | | 12/2013 | |
| WO | 2013178679 | | 12/2013 | |
| WO | 2013178697 | | 12/2013 | |
| WO | 2013178700 | | 12/2013 | |
| WO | 2013178701 | | 12/2013 | |
| WO | WO-2014056561 | A1 * | 4/2014 | ............ C09D 11/00 |
| WO | 2014067663 | A1 | 5/2014 | |
| WO | 2014170025 | | 10/2014 | |
| WO | 2015082062 | | 6/2015 | |
| WO | 2015124302 | | 8/2015 | |
| WO | 2016023693 | | 2/2016 | |
| WO | 2016041823 | | 3/2016 | |

OTHER PUBLICATIONS

Hardcopy of http://igf-bingen.de/Croda_produkte.pdf, Dec. 1, 2016. 3 pages.
International Preliminary Report on Patentability for PCT/EP2013/061044, dated Feb. 12, 2014. 7 pages.
International Preliminary Report on Patentability for PCT/EP2014/001723, dated Jun. 8, 2015. 16 pages.
International Preliminary Report on Patentability for PCT/EP2015/000443, dated Jan. 22, 2016. 6 pages.
International Preliminary Report on Patentability for PCT/EP2015/076072, dated May 16, 2017. 5 pages.
International Preliminary Report on Patentability for PCT/EP2016/071750, Apr. 10, 2018, 5 pages.
International Search Report for PCT/EP2013/003290, dated Feb 10, 2014. 5 pages.
International Search Report for PCT/EP2013/061044, dated May 15, 2014. 2 pages.
International Search Report for PCT/EP2013/061047, dated May 22, 2014. 3 pages.
International Search Report for PCT/EP2013/061075, dated May 15, 2014. 2 pages.
International Search Report for PCT/EP2013/061076, dated May 15, 2014, 2 pages.
International Search Report for PCT/EP2013/061100, dated Jul. 16, 2014. 4 pages.
International Search Report for PCT/EP2013/061100, dated Jul. 15, 2014. 4 pages.
International Search Report for PCT/EP2014/001722, dated Jan. 5, 2015. 3 pages.
International Search Report for PCT/EP2014/001723, dated Jan. 5, 2015. 3 pages.
International Search Report for PCT/EP2015/000443, dated Jun. 2, 2015. 2 pages.
International Search Report for PCT/EP2015/000871 dated Jul. 15, 2015. 3 pages.
International Search Report for PCT/EP2015/072453, dated Oct. 23, 2015. 2 pages.
International Search Report for PCT/EP2015/076072, dated Feb. 29, 2016. 2 pages.
International Search Report for PCT/EP2016/063433, dated Aug. 24, 2016. 2 pages.
International Search Report for PCT/EP2016/071750, dated Jan 28, 2017, 3 pages.
International Search Report for PCT/EP2016/074085, dated Jan 3, 2017, 3 pages.
Lichtenthaler, F.W., "Carbohydrates as Organic Raw Materials," in Ullmann's Encyclopedia of Industrial Chemistry, Wiley-VCH Verlag, 2010. (34 pages).
Palm fatty acid distillate (PFAD) [online] retrieved on May 21, 2018 from: https://www.neste.com/corporate-info/sustainability/sustainable-supply-chain/pfa d-residue-palm-oil-refining-process; 1 page (Year: 2018).
Plante et al. Castor Oil [online] retrieved on Jan. 13, 2016 from: http://www.dionex.com/en-us/webdocs/110518-PO-UHPLC-Castor-Oil-31May2011-LPN2822-01.pdf; 5 pages.
PubChem, Methylmeglumine, 2006. (Year: 2006) 9 pages.
Quack, et al., Fette-Seifen-Anstrichmittel 78, 200(1976). 7 pages.
R. Mohammadi, J. Wassink, A. Amirfazli, "Effect of Surfactants on Wetting of Super-Hydrophobic Surfaces", Langmuir, American Chemical Society, (Oct. 1, 2004), vol. 20, No. 22, doi:10.1021/la049268k, ISSN 07437463, pp. 9657-9662, XP055098502.
Smith, J.T. et al., "Micellar Electrokinetic Capillary Chromatography with in Situ Charged Micelles. 1. Evaluation of N-D-Gluco-N-methylalkanamide Surfactants as Anionic Borate Complexes," Anal. Chem. 1994, 66, 1119-1133.
Söderlind, E. et al., "The usefulness of sugar surfactants as solubilizing agents in parenteral formulations," Elsevier, International Journal of Pharmaceutics 252 (2003) pp. 61-71, Aug 19, 2002.
Study on Synthesis and Properties of "Green" Surfactants—Glucamine derivates, Zhao Handong, Master Thesis, Southern Yangtze University, pp. 5-6, Jul. 25, 2007.
Synergen OS Innovation Spotlight, Sep. 1, 2013, 5 pages.
Tan et al. (Appl Microbiol Biotechnol. 47:207-211) (Year: 1997).
Tegeler, T. et al., Special Guest Editor Section: Electrically Driven Microseparation Methods for Pesticides and Metabolites: I. Micellar Electrokinetic Capillary Chromatography of Carbamate Insecticides with MEGA-Borate and SDS Surfactants, Journal of AOAC International, vol. 82, No. 6, pp. 1542-1549, Nov. 6, 1999.
The Chemistry of Coconut Oil, accessed online Jul. 12, 2018 (Year: 2018) 5 pages.
V. Bergeron, P. Cooper, C. Fischer. J. Giermanska-Kahn, D. Langevin, and A. Pouchelon, "Polydimethylsiloxane (PDMS)-based antifoams" Colloids and Surfaces A: Physicochemical and Engineering Aspects 122 (1997) 103-120. 18 pages.
Walter, A.; Suchy, S.E.; Vinson, P.K., "Solubility properties of the alkylmethylglucamide surfactants", Biochimica et Biophysica Acta (BBA)-Biomembranes, Elsevier, Amsterdam, NL, Amsterdam, NL, (Nov. 2, 1990), vol. 1029, No. 1, doi:10.1016/0005-2736(90)90437-S, ISSN 0005-2736, pp. 67-74, XP023354648.
Zhu, Y-P, et al., "Surface Properties of N-Alkanoyl-N-Methy Glucamines and Related Materials", J. of Surfactants and Detergents, vol. 2, No. 3, Jul. 1, 1999. 6 pages.
"Phase behavior studies of quaternary systems containing N-lauroyl-N-methylglucamide/alcohol/alkane/water", Yang et. al., Journal of Colloid and Interface Science, Academic Press, New York, NY, US, vol. 320, No. 1, Feb. 19, 2008, pp. 283-289 (Year: 2008).
Anan Yaghmur et al., Langmuir, vol. 19, No. 4, pa 1063-1068, Feb 1, 2003.
Bouton et al, Langmuir, vol. 26, No. 11, pp. 7962-7966, Jun. 1, 2010.

(56) References Cited

OTHER PUBLICATIONS

Eliana Areanas et al: Langmuir, vol. 12, No. 2, pp. 588-590, Jan. 1, 1996.
Gregory J. McFann et al, Langmuir, vol. 9, No. 11, pp. 2942-2948, Nov. 1, 1993.
Howard, et al., "Comparison of Flowback Aids: Understanding Their Capillary Pressure and Wetting Properties", SPE Paper 122307, 2009, 16 pages.
International Preliminary Report on Patentability for PCT/EP2015/070567, dated Dec. 23, 2016, 12 pages.
International Search Report for PCT/EP2015/070567, dated Mar. 22, 2016, 5 pages.
Panga, et al., "Wettability Alteration for Water-Block Prevention in High-Prevention in High-Temperature Gas Wells", SPE Paper 100182, 2006, 13 pages.
Penny, et al., "Field Studies of Drilling and Completion Fluids to Minimize Damage and Enhance Gas Production in Unconventional Reservoirs", SPE Paper 107844, 2007, 11 pages.
Pursley, et al., "Microemulsion Additive Enable Optimized Formation Damage Repair and Prevention" Paper 86556, 2004, SPE, 7 pages.
Quintero, et al., "Proper Design Criteria of Microemulsion Treatment fluids for Enhancing Well Production", SPE 144451, 2012, 10 pages.
Rickman, et al., "Optimizing Microemulsion/surfactant Packages for Shale and Tight-Gas Reservoirs", Paper 131107, 2010, SPE, 7 pages.
S. Ray et al., Langmuir, vol. 10, No. 8, pp. 2511-2515, Aug. 1, 1994.
S. Ezrahi et al., Journal of Colloid and Interface Science, vol. 191, No. 2, pp. 277-290, Jul. 1, 1997.

\* cited by examiner

N-ALKYL GLUCAMINE-BASED UNIVERSAL PIGMENT DISPERSIONS

The present invention provides water-based binder-free pigment dispersions and for the use thereof for coloring aqueous and solventborne paints, emulsion paints and gloss paints of all kinds.

On the market and in the literature, there are a multitude of known aqueous pigment dispersions, also referred to as pigment pastes, which are used for coloring aqueous emulsion paints and varnishes. These pigment dispersions are used as tinting pastes in hardware stores, paint factories and specialist art shops.

For this purpose, with the aid of dosing and tinting systems, aqueous pigment paste is added to aqueous paints and varnishes. In order to improve compatibility with the base paints, the pigment dispersions are typically adjusted to a basic pH with bases. For this purpose, the person skilled in the art is sufficiently well-aware of the use of alkali, for example NaOH or KOH or else amine bases, for example alkanolamines such as 2-amino-2-methylpropan-1-ol (AMP-90/95, from Angus), and this is described, for example, in US 2012/0024193 along with secondary alkanolamines branched in the a position.

The European Coatings Journal in 2009, vol. 07, on pages 26 to 28, also teaches that blue pigment pastes comprising such secondary alkanolamines as neutralizing agents and co-dispersants generate higher color intensities and, using the example of 2-(sec-butylamino)ethanol (Alpamine® N41, from Arkema), states that this can reduce the costs for shaded paints.

It is also possible in this way to color solventborne paints and varnishes. For this purpose, specific solvent-based pastes are available on the market; in addition, there is increasing employment of universal pigment dispersions suitable for coloring both aqueous and solventborne paints, emulsion paints and gloss paints of all kinds.

WO 2013/016270 teaches VOC-free secondary and tertiary alkanolamines which are used in binder-containing paints and lead to an improvement in gloss and wet abrasion.

The production of further VOC-free amino alcohols and the use thereof in binder-containing paints as neutralizing agents are taught in US 2011/0146536.

The neutralizing capacity of trihydroxymonoamines or trihydroxydiamines in aqueous binder-containing paints is taught in WO 2010/126657 and US 2010/0326320. The properties of the resulting paints and coatings are likewise described with regard to viscosity, concealing power, yellowing, gloss, wet abrasion resistance and bonding power.

EP 1676831 teaches N,N-dialkylglucamines which can be used in aqueous, binder-containing printing inks.

US 2002/04066 teaches aqueous, dispersant-free printing inks comprising alkyl-, hydroxyalkyl- or arylamines.

In practice, it is found that these universal pigment dispersions have only inadequate compatibility in solventborne paints and varnishes, which is manifested in that the aqueous pigment dispersions used do not display their full color intensity or concealing power and hence more of the pigment dispersion has to be added to achieve the desired hue. This extra consumption leads to higher costs in the coloring of paints and varnishes. Furthermore, the amine bases described contribute to an increase in the VOC content.

It was therefore an object of the present invention to provide aqueous, binder-free pigment dispersions compatible both with aqueous and with solventborne coatings. Furthermore, no VOC-containing ingredients should be added to the pigment dispersions.

It has been found that the abovementioned objects are achieved, surprisingly, by aqueous, binder-free pigment dispersions that use N-alkylglucamines for pH adjustment and as co-dispersants.

The present invention provides aqueous pigment dispersions comprising
(A) at least one organic and/or inorganic pigment,
(B) one or more dispersants and/or surfactants,
(C) at least one compound of the formula (I)

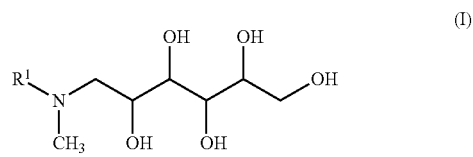

in which $R^1$ is H, $C_1$-$C_4$-alkyl $CH_2CH_2OH$ or $CH_2CH(CH_3)OH$,
(D) optionally one or more polyalkylene glycols,
(E) optionally further additives customary for production of aqueous pigment dispersions and
(F) water.

Preferred pigment preparations comprise the following amounts of the components:
(A) 5% to 80% by weight,
(B) 0.1% to 30% by weight,
(C) 0.1% to 10% by weight,
(D) 0% to 10% by weight,
(E) 0% to 30% by weight,
(F) ad 100%,
based in each case on the total weight of the pigment dispersion.

In a further preferred form, the pigment dispersions of the invention have a pH of >7, in a particularly preferred form a pH between 8 and 10.

In a further preferred form, the pigment dispersions of the invention have a VOC content of <1%, measured according to DIN 11890-2.

Component (A) of the pigment dispersion of the invention is preferably a finely divided, organic or inorganic, white or chromatic pigment or a mixture of various pigments of this kind. As an illustrative selection of particularly preferred organic pigments, mention should be made here of monoazo- and disazo pigments, especially the Color Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and naphthol AS pigments, especially the Color Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 254, Pigment Red 256, Pigment Orange 5, Pigment Orange 38 or Pigment Brown 1; laked azo and metal complex pigments, especially the Color Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, especially the Color Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, especially the Color Index pigments Pigment Yellow 139 or Pigment Yellow 173; phthalocyanine pigments, especially the Color Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, especially the Color Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, especially the Color Index pigments Pigment Red 169, Pigment Blue 56 or Pigment Blue 61.

Suitable inorganic pigments are, for example, carbon black pigments, for example gas blacks or furnace blacks; titanium dioxides, zinc sulfides, zinc oxides, iron oxides, magnetites, manganese iron oxides, chromium oxides, ultramarine, nickel antimony titanium oxides or chromium antimony titanium oxides, manganese titanium rutiles, cobalt oxides, mixed oxides of cobalt and aluminum, rutile mixed phase pigments, sulfides of the rare earths, spinels of cobalt with nickel and zinc, spinels based on iron and chromium with copper, zinc and manganese, bismuth vanadates and extender pigments. More particularly, the Color Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 7, Pigment Black 11, Pigment Black 33 and Pigment White 6 are used. Preferably, mixtures of inorganic pigments are also frequently used. Mixtures of organic with inorganic pigments are likewise frequently used.

Suitable components (B) of the pigment dispersions of the invention are customary polymeric and surfactant-type dispersants or mixtures of such substances. Typically, these are nonionic, anionic or amphoteric interface-active substances which are sufficiently well-known to those skilled in the art. Of the multitude of known compounds, a representative selection is cited hereinafter, but without restricting the applicability of the invention thereto.

As an illustrative selection of particularly preferred polymeric dispersants, mention should be made here of condensation products of formaldehyde with substituted and unsubstituted longer- and shorter-chain alkylphenols having 1 to 20 carbon atoms and the alkoxylation products thereof, the novolaks, and derivatives; styrene-phenol condensates including the condensation products formed from substituted phenols and styrenes, and the alkoxylation products thereof. In addition, these condensation products may take the form of ionic derivatives, for example of sulfates, sulfonates, succinic monoesters, phosphates, phosphonates or carboxylates, and salts thereof. Mention should also be made of partly or fully neutralized acrylate resins, modified polyacrylates and copolymers of acrylic acid and/or methacrylic acid and/or esters thereof and/or amides thereof. Further monomer units for corresponding copolymers may be maleic acid and/or the esters, amides and/or anhydrides thereof and/or styrene. Polymeric dispersants usually have a mean molar mass of Mn between 1000 and 100 000 g/mol, preferably 2000 to 50 000 g/mol, and may take the form of random or block polymers.

As an illustrative selection of particularly preferred surfactant-type dispersants, mention should be made here of linear and branched, saturated and unsaturated alkylsulfonates, for example dodecylsulfonate, laurylsulfonate and stearylsulfonate, and the corresponding alkylphosphates. In addition, it is possible to use alkoxylation products of unbranched or branched, linear or cyclic $C_3$-$C_{20}$-alkyl radicals, or substituted or unsubstituted aryl radicals, or linear fatty alcohols, fatty acids, fatty amines or fatty amides. Examples of suitable alkylene oxides are ethylene oxide, propylene oxide, butylene oxide or styrene oxide. These alkoxylation products may additionally be provided with ionic head groups, for example as sulfates, sulfonates, succinic monoesters, phosphates, phosphonates or carboxylates and salts thereof. Additionally suitable are lecithins and sulfosuccinates.

Compound (I) in the context of component (C) is a polyhydroxyamine

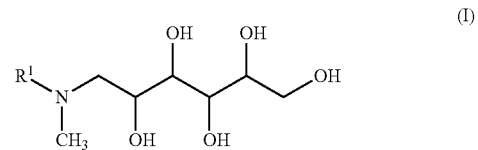

where $R^1$ may be H, $C_1$-$C_4$-alkyl, $CH_2CH_2OH$ or $CH_2CH(CH_3)OH$.

Preferably, $R^1$ is H, methyl or $CH_2CH_2OH$.

The polyhydroxy unit is a hexose, preferably the epimer glucose.

The process for preparing the alkylglucamines of the formula (I) is sufficiently well-known to those skilled in the art. For compounds with $R=C_1$- to $C_4$-alkyl, for example, it is effected by the method specified in EP-A-1676831, by reductive alkylation of N-alkylpolyhydroxylamines with aldehydes or ketones in the presence of hydrogen and a transition metal catalyst. Hydroxyethyl- and hydroxypropyl-N-methylglucamine can be prepared by reaction of N-methylglucamine with ethylene oxide or propylene oxide in aqueous solution. The compounds of the formula (I) can be used in the form of pure substances or in the form of aqueous solutions. Since the tertiary amines, such as dimethylglucamine and hydroxyethyl- and hydroxypropyl-N-methylglucamine, are less prone to the formation of nitrosamines, these are preferable for the dispersions of the invention.

Polyalkylene glycols, component (D), of the dispersions of the invention are homo- or copolymers of alkylene oxides. Examples of suitable alkylene oxides are ethylene oxide, propylene oxide, butylene oxide or styrene oxide. In addition, it is possible to use polyalkylene glycols started from mono-, di-, tri-, tetra- or pentahydric alcohols or mono-, di-, tri-, tetra- or pentafunctional amines having a branched or star-shaped structure. The polyalkylene glycols used contain typically 4 to 1000 mol of alkylene oxide, preferably 4 to 200 mol.

Further additives customary for production of aqueous pigment dispersions, component (E), that may be used are preservatives/biocides, defoamers, deaerating agents, fillers, solvents, light stabilizers, antioxidants or thickeners, anti-settling agents and rheology additives. Additional wetting agents may, for example, be wetting agents based on polysiloxane ethers.

Water used for production of the inventive aqueous pigment dispersions, component (F), is preferably used in the form of distilled or demineralized water. It is also possible to use drinking water (tap water) and/or water of natural origin.

The present invention also further provides a process for producing the pigment dispersions of the invention. For this purpose, component (A), which is typically in the form of powder, flakes or granules, is dispersed in a manner customary per se in the presence of water (F) and of components (B) and (C) and optionally (D) and (E). Subsequently, it is optionally possible to mix in further water (F), in order to adjust the aqueous pigment dispersion obtained to the desired concentration. Preferably, the liquid components (B), (C), (F) and optionally (D) are first mixed and homogenized, then the solid components (A) and (D) in the form of powder, granules or flakes are stirred into the initially charged mixture, with conversion of the pigment and optionally of the fillers to a paste and preliminary dispersion thereof. According to the particle hardness of the pigments used, this is optionally followed by fine dispersion or fine distribution, while cooling, with the aid of a grinding or dispersing unit. For this purpose, it is possible to use stirrer systems, dissolvers (sawtooth stirrers), rotor-stator mills, ball mills, stirred ball mills such as sand mills and bead mills, high-speed mixers, kneading apparatuses, roll mills or high-performance bead mills. The fine dispersion or grinding of the pigments is effected down to the desired particle size distribution, and can be effected at temperatures in the range from 0 to 100° C., appropriately at a temperature between 10 and 70° C., preferably at 20 to 60° C. After the fine dispersion, the pigment preparation can be diluted further with water (F). However, the production of the pigment dispersions of the invention is not restricted to the process, and so component (C) can also, for example, be added only after the grinding.

The pigment dispersions of the invention are suitable for pigmentation and coloring of all kinds of macromolecular materials. The pigment dispersions of the invention are particularly suitable for pigmentation or production of aqueous and solventborne, colorless and concealing emulsion paints and other paints, dispersion-based varnishes, printing inks (for example textile printing, flexographic printing, decorative printing or intaglio printing inks), wallpaper inks; aqueous, water-thinnable and solventborne, colorless and concealing varnishes, woodstains, wood preservative systems, and varnishes for surface coating of articles made, for example, from metal, wood, plastic, glass, ceramic, concrete, textile material, paper or rubber.

A particular property of the pigment dispersions of the invention is their use as universal tinting pastes. Universal tinting pastes are suitable both for coloring aqueous paints and for tinting solventborne varnishes. If aqueous pigment preparations are used for coloring solventborne varnishes, there can be agglomeration of the pigments and floating of the agglomerated pigments in the varnish, and this is manifested in the case of chromatic pigments by loss of color intensity or of concealing capacity in the case of white pigments.

EXAMPLES

The VOC content of a pigment dispersion is the sum total of the individual components in a dispersion that have a boiling point below 250° C. at 101.3 kPa. In order to formulate a VOC-free pigment dispersion, therefore, only those ingredients having a boiling point greater than 250° C. should be selected. In the case of use of amines that are customary on the market (examples 1 and 2, table 1), depending on their use concentration, these contribute 100% to the VOC content of the dispersion. Polyhydroxyamines of the formula (I) have a low VOC level owing to their high melting point and boiling point.

TABLE 1

Boiling points of neutralizing agents

| Example | Neutralizing agent | Boiling point [° C.] |
|---|---|---|
| 1 (C) | 2-Amino-2-methylpropan-1-ol | 165 |
| 2 (C) | 2-(sec-Butylamino)ethanol | 186 |
| 3 | Compound of the formula (I) with R = H | >>250 (m.p. 130° C.) |
| 4 | Compound of the formula (I) with R = CH$_3$ | >>250 (m.p. 90° C.) |

Production of a Pigment Dispersion

The pigment, in the form of powder, granules or a presscake, together with the dispersants and the other additives, is converted to a paste in deionized water and then homogenized and predispersed with a dissolver (for example from VMA-Getzmann GmbH, AE3-M1 type) or another suitable apparatus, preferably with the aid of a dispersing disk. For dispersion, the liquid components, the dispersant concentrate comprising components (B) and (C), and further components (D) and (F) are initially charged in a grinding vessel and mixed. Subsequently, the pulverulent components (A) and optionally (E) are added and predispersed with the dissolver. The subsequent fine dispersion is effected with the aid of a bead mill (for example AE3-M1 from VMA-Getzmann) or else another suitable dispersing unit, the grinding being effected with mixed zirconia beads of size d=1.3-1.7 mm with cooling. Subsequently, the grinding bodies are removed and the pigment preparation is isolated.

Example 5 (Comparative Example)

65.5 parts C.I. Pigment Red 101 (Bayferrox ® Red 130, from Lanxess, component (A)),
10.0 parts mixture of an anionic and nonionic dispersant (Dispersogen ® AN 200, from Clariant, component (B)),
1.1 parts sodium hydroxide solution (10% aqueous solution, component (C)),
6.0 parts glycerol ethoxylate having a molecular weight of 300 g/mol (Polyglykol G 300, from Clariant, component (D)),
0.3 part defoamer (Byk-018, from Byk, component (E)),
0.2 part preservative (Acticide MBS, from Thor, component (E)),
16.9 parts water (component (F))

Example 6 (Comparative Example)

| | | |
|---|---|---|
| 65.5 parts | C.I. Pigment Red 101 (Bayferrox ® Red 130, from Lanxess, component (A)), |
| 10.0 parts | mixture of an anionic and nonionic dispersant (Dispersogen ® AN 200, from Clariant, component (B)), |
| 0.3 part | 2-amino-2-methylpropan-1-ol (95% aqueous solution, AMP-95, from Angus, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 17.7 parts | water (component (F)) |

Example 7 (Comparative Example)

| | | |
|---|---|---|
| 65.5 parts | C.I. Pigment Red 101 (Bayferrox ® Red 130, from Lanxess, component (A)), |
| 10.0 parts | mixture of an anionic and nonionic dispersant (Dispersogen ® AN 200, from Clariant, component (B)), |
| 0.4 part | 2-(sec-butylamino)ethanol ((Alpamine ® N41, from Arkema), component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 17.6 parts | water (component (F)) |

Example 8

| | | |
|---|---|---|
| 65.5 parts | C.I. Pigment Red 101 (Bayferrox ® Red 130, from Lanxess, component (A)), |
| 10.0 parts | mixture of an anionic and nonionic dispersant (Dispersogen ® AN 200, from Clariant, component (B)), |
| 1.5 parts | compound of the formula (I) with R = H (30% aqueous solution, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 16.5 parts | water (component (F)) |

Example 9

| | | |
|---|---|---|
| 65.5 parts | C.I. Pigment Red 101 (Bayferrox ® Red 130, from Lanxess, component (A)), |
| 10.0 parts | mixture of an anionic and nonionic dispersant (Dispersogen ® AN 200, from Clariant, component (B)), |
| 1.3 parts | compound of the formula (I) with R = $CH_3$ (50% aqueous solution, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 16.7 parts | water (component (F)) |

Example 10 (Comparative Example)

| | | |
|---|---|---|
| 65.5 parts | C.I. Pigment Yellow 184 (Sicopal ® Gelb L 1100, from BASF, component (A)), |
| 10.0 parts | mixture of an anionic and nonionic dispersant (Dispersogen ® AN 200, from Clariant, component (B)), |
| 1.0 parts | sodium hydroxide solution (10% aqueous solution, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 17.0 parts | water (component (F)) |

Example 11 (Comparative Example)

| | | |
|---|---|---|
| 65.5 parts | C.I. Pigment Yellow 184 (Sicopal ® Gelb L 1100, from BASF, component (A)), |
| 10.0 parts | mixture of an anionic and nonionic dispersant (Dispersogen ® AN 200, from Clariant, component (B)), |
| 0.2 part | 2-amino-2-methylpropan-1-ol (95% aqueous solution, AMP-95, from Angus, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 17.8 parts | water (component (F)) |

Example 12 (Comparative Example)

| | | |
|---|---|---|
| 65.5 parts | C.I. Pigment Yellow 184 (Sicopal ® Gelb L 1100, from BASF, component (A)), |
| 10.0 parts | mixture of an anionic and nonionic dispersant (Dispersogen ® AN 200, from Clariant, component (B)), |
| 0.2 part | 2-(sec-butylamino)ethanol ((Alpamine ® N41, from Arkema), component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 17.8 parts | water (component (F)) |

Example 13

| | | |
|---|---|---|
| 65.5 parts | C.I. Pigment Yellow 184 (Sicopal ® Gelb L 1100, from BASF, component (A)), |
| 10.0 parts | mixture of an anionic and nonionic dispersant (Dispersogen ® AN 200, from Clariant, component (B)), |
| 1.4 parts | compound of the formula (I) with R = H (30% aqueous solution, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 16.6 parts | water (component (F)) |

Example 14

| | | |
|---|---|---|
| 65.5 parts | C.I. Pigment Yellow 184 (Sicopal ® Gelb L 1100, from BASF, component (A)), |
| 10.0 parts | mixture of an anionic and nonionic dispersant (Dispersogen AN ® 200, from Clariant, component (B)), |
| 1.4 parts | compound of the formula (I) with R = $CH_3$ (50% aqueous solution, component (C)), |

-continued

| | | |
|---|---|---|
| 6.0 parts | glycerol ethoxylate having a molecular weight of 300 g/mol (Polyglykol G 300, from Clariant, component (D)), | |
| 0.3 part | defoamer (Byk-018, from Byk, component (E)), | |
| 0.2 part | preservative (Acticide MBS, from Thor, component (E)), | |
| 16.6 parts | water (component (F)) | |

To characterize the dispersions, they were first aged at 60° C. for 7 days; all the pastes were stable over this period. In addition, the viscosity of the pigment dispersions was determined in a Haake VT 550 rheometer at a shear rate of 1/60 s and a temperature of 23° C. The results are listed in table 3 and have a pigment-typical viscosity.

To determine the compatibility of the pigment dispersions based on various base coatings, 2% by weight of the dispersion was stirred into the paints and varnishes A-D (table 2) and drawn down onto a contrast card in a 200 μm coat, and the color intensity was determined. The color intensity results are listed in table 3, and have the highest color intensities for the inventive polyhydroxyamines of the formula (I) both for red (examples 8 and 9) and for yellow (examples 13 and 14). The pastes comprising 2-(sec-butylamino)ethanol (comparative examples 7 and 12) are incompatible with solventborne coatings and lead to flocculation in use and hence are not amenable to colorimetry.

TABLE 2

Coatings used for testing compatibility

| Paint/ varnish | Description |
|---|---|
| A | Aqueous clearcoat based on an acrylate and polyurethane dispersion. Solids content: 40% |
| B | Aqueous clearcoat based on a polyurethane dispersion. Solids content: 35% |
| C | Solventborne alkyd resin clearcoat based on oils and aliphatic solvent. Solids content: 39% |

TABLE 2-continued

Coatings used for testing compatibility

| Paint/ varnish | Description |
|---|---|
| D | Solventborne alkyd resin clearcoat based on aliphatic solvent. Solids content: 37% |

Parts or percentage figures are parts by weight or percent by weight, unless stated otherwise.

TABLE 3

Results for examples 5 to 14

| Example | Outward appearance | pH | Viscosity [mPas] | Color intensity/coating [%] | | | |
|---|---|---|---|---|---|---|---|
| | | | | A | B | C | D |
| 5 (C) | liquid and homogeneous | 8.1 | 455 | 96 | 97 | 93 | 81 |
| 6 (C) | liquid and homogeneous | 8.1 | 513 | 96 | 98 | 88 | 81 |
| 7 (C) | thixotropic and foamy | 8.1 | 521 | 98 | 95 | flocculated | flocculated |
| 8 | liquid and homogeneous | 8.1 | 638 | 100 | 99 | 97 | 92 |
| 9 | liquid and homogeneous | 8.1 | 558 | 100 | 100 | 100 | 100 |
| 10 (C) | liquid and homogeneous | 8.5 | 243 | 96 | 99 | 96 | 98 |
| 11 (C) | liquid and homogeneous | 8.5 | 176 | 92 | 97 | 96 | 97 |
| 12 (C) | slight sediment | 8.5 | 135 | 69 | 65 | flocculated | flocculated |
| 13 | liquid and homogeneous | 8.5 | 311 | 94 | 95 | 102 | 103 |
| 14 | liquid and homogeneous | 8.5 | 256 | 100 | 100 | 100 | 100 |

For white pigments, the determination of the color intensity is unsuitable in the case of clearcoats. What is more suitable here is the determination of the concealing capacity as evidence of the fine distribution of the pigment in the paint film; complete incompatibility leads to encapsulation of the pigment and the paint film appears clear (zero or barely any concealing capacity). For this purpose, the pigment dispersions which follow (examples 11 to 15) were produced with white pigment and then the concealing capacity was determined. For this purpose, the colorless base paints were admixed with 10% by weight of the titanium dispersions, and a 400 μm paint film was drawn down on a black/white contrast card. After drying, the contrast between the white and black region was determined.

Example 15 (Comparative Example)

| | | |
|---|---|---|
| 65.5 parts | C.I. Pigment White 6 (Kronos ® 2160, from Kronos, component (A)), | |
| 10.0 parts | mixture of an anionic and nonionic dispersant (Dispersogen ® AN 200, from Clariant, component (B)), | |
| 0.3 part | 2-amino-2-methylpropan-1-ol (95% aqueous solution, AMP-95, from Angus, component (C)), | |
| 6.0 parts | glycerol ethoxylate having a molecular weight of 300 g/mol (Polyglykol G 300, from Clariant, component (D)), | |
| 0.3 part | defoamer (Byk-018, from Byk, component (E)), | |
| 0.2 part | preservative (Acticide MBS, from Thor, component (E)), | |
| 17.7 parts | water (component (F)) | |

Example 16 (Comparative Example)

| | |
|---|---|
| 65.5 parts | C.I. Pigment White 6 (Kronos ® 2160, from Kronos, component (A)), |
| 10.0 parts | mixture of an anionic and nonionic dispersant (Dispersogen ® AN 200, from Clariant, component (B)), |

-continued

| | |
|---|---|
| 0.8 part | 2-(sec-butylamino)ethanol ((Alpamine ® N41, from Arkema), component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 17.2 parts | water (component (F)) |

Example 17

| | |
|---|---|
| 65.5 parts | C.I. Pigment White 6 (Kronos ® 2160, from Kronos, component (A)), |
| 10.0 parts | mixture of an anionic and nonionic dispersant (Dispersogen ® AN 200, from Clariant, component (B)), |
| 1.5 parts | compound of the formula (I) with R = H (30% aqueous solution, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 16.5 parts | water (component (F)) |

Example 18

| | |
|---|---|
| 65.5 parts | C.I. Pigment White 6 (Kronos ® 2160, from Kronos, component (A)), |
| 10.0 parts | mixture of an anionic and nonionic dispersant (Dispersogen ® AN 200, from Clariant, component (B)), |
| 1.3 parts | compound of the formula (I) with R = CH$_3$ (50% aqueous solution, component (C)), |
| 6.0 parts | glycerol ethoxylate having a molecular weight of 300 g/mol (Polyglykol G 300, from Clariant, component (D)), |
| 0.3 part | defoamer (Byk-018, from Byk, component (E)), |
| 0.2 part | preservative (Acticide MBS, from Thor, component (E)), |
| 16.7 parts | water (component (F)) |

The results of the concealing power determination are listed in table 4. Pigment dispersions comprising polyhydroxyamines of the formula (I) are universally suitable for generation of concealing power in aqueous and solventborne coatings alike.

Polyhydroxyamines of the formula (I) are suitable as neutralizing agents for aqueous pigment dispersions without contributing to the VOC content. The pastes are suitable for coloring both aqueous and solventborne paints, varnishes and coatings, in that the polyhydroxyamines of the formula (I) assure high color acceptance and act as mediators between solventborne and aqueous systems.

TABLE 4

Results for examples 15 to 18

| Example | Outward appearance | pH | Viscosity [mPas] | Concealing power/coating [%] | | | |
|---|---|---|---|---|---|---|---|
| | | | | A | B | C | D |
| 15 (C) | pasty and homogeneous | 9.0 | 1949 | 97 | 98 | 97 | 98 |
| 16 (C) | thixotropic and homogeneous | 9.0 | 1621 | 96 | 97 | flocculated | flocculated |
| 17 | pasty and homogeneous | 9.0 | 3348 | 98 | 98 | 98 | 98 |
| 18 | pasty and homogeneous | 9.0 | 4911 | 99 | 99 | 99 | 99 |

The invention claimed is:

1. An aqueous, water-thinnable or solvent borne varnish comprising at least one aqueous, binder-free pigment dispersion, wherein the at least one aqueous, binder-free pigment dispersion comprises
   (A) at least one organic and/or inorganic pigment,
   (B) one or more dispersants and/or surfactants,
   (C) at least one compound of the formula (I)

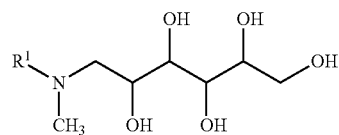

in which R$^1$ is H, C$_1$-C$_4$-alkyl, CH$_2$CH$_2$OH or CH$_2$CH(CH$_3$)OH, and
   (F) water.

2. The aqueous, water-thinnable or solvent borne varnish as claimed in claim 1, in which R$^1$ is methyl or CH$_2$CH$_2$OH.

3. The aqueous, water-thinnable or solvent borne varnish as claimed in claim 1, in which R$^1$ is methyl.

4. The aqueous, water-thinnable or solvent borne varnish as claimed in claim 1, wherein the inorganic pigment is a metal oxide pigment.

5. The aqueous, water-thinnable or solvent borne varnish as claimed in claim 1, comprising 5% to 80% by weight of component (A) based on the total weight of the pigment dispersion.

6. The aqueous, water-thinnable or solvent borne varnish as claimed in claim 1, comprising 0.1% to 30% by weight of component (B) based on the total weight of the pigment dispersion.

7. The aqueous, water-thinnable or solvent borne varnish as claimed in claim 1, comprising 0.1% to 10% by weight of component (C) based on the total weight of the pigment dispersion.

8. The aqueous, water-thinnable or solvent borne varnish as claimed in claim 1, comprising one or more polyalkylene glycols as component (D) in an amount of 0.1% to 10% by weight, based on the total weight of the pigment dispersion.

9. The aqueous, water-thinnable or solvent borne varnish as claimed in claim 1, comprising further additives customary for production of aqueous pigment dispersions as components (E) in an amount of 0% to 30% by weight, based on the total weight of the pigment dispersion.

10. An aqueous, water-thinnable or solvent borne paint comprising at least one aqueous, binder-free pigment dispersion, wherein the at least one aqueous, binder-free pigment dispersion comprises
(A) at least one organic and/or inorganic pigment,
(B) one or more dispersants and/or surfactants,
(C) at least one compound of the formula (I)

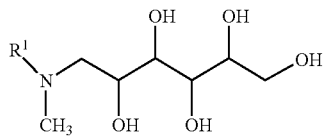

in which $R^1$ is H, $C_1$-$C_4$-alkyl, $CH_2CH_2OH$ or $CH_2CH(CH_3)OH$, and
(F) water.

11. The aqueous, water-thinnable or solvent borne paint as claimed in claim 10, in which $R^1$ is methyl or $CH_2CH_2OH$.

12. The aqueous, water-thinnable or solvent borne paint as claimed in claim 10, in which $R^1$ is methyl.

13. The aqueous, water-thinnable or solvent borne paint as claimed in claim 10, wherein the inorganic pigment is a metal oxide pigment.

14. The aqueous, water-thinnable or solvent borne paint as claimed in claim 10, comprising 5% to 80% by weight of component (A) based on the total weight of the pigment dispersion.

15. The aqueous, water-thinnable or solvent borne paint as claimed in claim 10, comprising 0.1% to 30% by weight of component (B) based on the total weight of the pigment dispersion.

16. The aqueous, water-thinnable or solvent borne paint as claimed in claim 10, comprising 0.1% to 10% by weight of component (C) based on the total weight of the pigment dispersion.

17. The aqueous, water-thinnable or solvent borne paint as claimed in claim 10, comprising one or more polyalkylene glycols as component (D) in an amount of 0.1% to 10% by weight, based on the total weight of the pigment dispersion.

18. The aqueous, water-thinnable or solvent borne paint as claimed in claim 10, comprising further additives customary for production of aqueous pigment dispersions as components (E) in an amount of 0% to 30% by weight, based on the total weight of the pigment dispersion.

19. An aqueous, water-thinnable or solvent borne ink comprising at least one aqueous, binder-free pigment dispersion, wherein the at least one aqueous, binder-free pigment dispersion comprises
(A) at least one organic and/or inorganic pigment,
(B) one or more dispersants and/or surfactants,
(C) at least one compound of the formula (I)

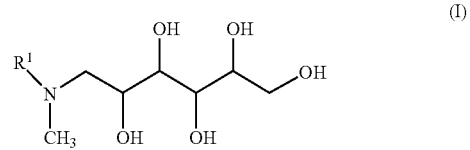

in which $R^1$ is H, $C_1$-$C_4$-alkyl, $CH_2CH_2OH$ or $CH_2CH(CH_3)OH$, and
(F) water.

20. The aqueous, water-thinnable or solvent borne ink as claimed in claim 19, in which $R^1$ is methyl or $CH_2CH_2OH$.

21. The aqueous, water-thinnable or solvent borne ink as claimed in claim 19, in which $R^1$ is methyl.

22. The aqueous, water-thinnable or solvent borne ink as claimed in claim 19, wherein the inorganic pigment is a metal oxide pigment.

23. The aqueous, water-thinnable or solvent borne ink as claimed in claim 19, comprising 5% to 80% by weight of component (A) based on the total weight of the pigment dispersion.

24. The aqueous, water-thinnable or solvent borne ink as claimed in claim 19, comprising 0.1% to 30% by weight of component (B) based on the total weight of the pigment dispersion.

25. The aqueous, water-thinnable or solvent borne ink as claimed in claim 19, comprising 0.1% to 10% by weight of component (C) based on the total weight of the pigment dispersion.

26. The aqueous, water-thinnable or solvent borne ink as claimed in claim 19, comprising one or more polyalkylene glycols as component (D) in an amount of 0.1% to 10% by weight, based on the total weight of the pigment dispersion.

27. The aqueous, water-thinnable or solvent borne ink as claimed in claim 19, comprising further additives customary for production of aqueous pigment dispersions as components (E) in an amount of 0% to 30% by weight, based on the total weight of the pigment dispersion.

* * * * *